United States Patent
Janke

(10) Patent No.: US 7,434,038 B2
(45) Date of Patent: Oct. 7, 2008

(54) MICROPROCESSOR ARRANGEMENT FOR UPDATING FLAG BITS FOR SECURITY PURPOSES AND METHOD FOR OPERATING THE SAME

(75) Inventor: Marcus Janke, Munich (DE)

(73) Assignee: Infineon Technologies AG (DE)

( * ) Notice: Subject to any disclaimer, the term of this patent is extended or adjusted under 35 U.S.C. 154(b) by 83 days.

(21) Appl. No.: 11/009,402

(22) Filed: Dec. 10, 2004

(65) Prior Publication Data

US 2005/0144425 A1    Jun. 30, 2005

(30) Foreign Application Priority Data

Dec. 12, 2003 (DE) .................. 103 58 358

(51) Int. Cl.
*G06F 9/00* (2006.01)
(52) U.S. Cl. ..................................... 712/244
(58) Field of Classification Search ............ 712/224, 712/244
See application file for complete search history.

(56) References Cited

U.S. PATENT DOCUMENTS

| | | | | |
|---|---|---|---|---|
| 5,996,069 | A * | 11/1999 | Yasoshima et al. | 712/234 |
| 6,484,251 | B1 * | 11/2002 | McDonald et al. | 712/23 |
| 6,654,884 | B2 * | 11/2003 | Jaffe et al. | 713/168 |
| 6,904,515 | B1 * | 6/2005 | Van Dyke | 712/226 |
| 6,907,526 | B2 * | 6/2005 | Tanimoto et al. | 713/174 |
| 2001/0053220 | A1 * | 12/2001 | Kocher et al. | 380/29 |
| 2003/0188133 | A1 * | 10/2003 | Henry et al. | 712/218 |

OTHER PUBLICATIONS

"DPA Countermeasure Based on the 'Masking Method'"; Itoh et al.; Springer; 2002.*
"On Boolean and Arithmetic Masking against Differential Power Analysis"; Coron et al.; Springer; 2000.*
TriCore Architecture Overview Handbook; User's Manual, V 1.3.0, Aug. 1999; Infineon Technologies AG; S. 4, 18.
TMS320C55x DSP Mnemonic Instruction Set Reference Guide, Texas Instruments Inc., Dallas, TX, USA, Literature No. SPRU374E, Apr. 2001, pp. 1-11 and 4-2, http://www.tkt.cs.tut.fi/kurssit/3516/exercises/fall05/spru374e.pdf.

* cited by examiner

*Primary Examiner*—Tonia L. M. Dollinger
*Assistant Examiner*—Benjamin Geib
(74) *Attorney, Agent, or Firm*—Dickstein, Shapiro, LLP.

(57) ABSTRACT

Microprocessor arrangement and a method for operating a microprocessor arrangement, where the microprocessor arrangement has an execution unit for controlling a program cycle and for processing arithmetic and logic operations, a working register which stores a result of an operation and which is coupled to a control element in the execution unit, a flag register which indicates information about the result of the operation using flag bits, and combinational logic elements which are connected to the working register, wherein the combinational logic elements are controlled such that the state of the flag bits in the flag register is updated after the executed operation only if execution of one of subsequent operations within the program cycle requires a status of the flag bits.

11 Claims, 1 Drawing Sheet

US 7,434,038 B2

MICROPROCESSOR ARRANGEMENT FOR UPDATING FLAG BITS FOR SECURITY PURPOSES AND METHOD FOR OPERATING THE SAME

CROSS-REFERENCE TO RELATED APPLICATION

This application claims priority to German Patent Application Serial No. 10358358.0, filed Dec. 12, 2003, and which is incorporated herein by reference in its entirety.

FIELD OF THE INVENTION

The application relates to a microprocessor arrangement having an execution unit, a main memory and a flag register which indicates information from an executed operation in a program.

The invention also relates to a method for operating a microprocessor arrangement.

BACKGROUND OF THE INVENTION

To process logic and arithmetic operations in a program, microprocessor arrangements have an execution unit, an "arithmetic and logic unit" (ALU) and associated working registers which are used for storing (buffering) addresses and data which are required for a task which is currently being processed by the execution unit.

Working registers, such, as accumulators, ensure, inter alia, rapid, random and simultaneous read and/or write access to operands which are involved in a computation operation in the ALU. One of these working registers to which a programmer has access is the "flag register", which contains information about the last computation result obtained when executing the task or operation. To this end, the execution unit has control elements, for example comparison means, which evaluate the content of an accumulator after a computation or storage operation has been carried out and set or erase flags in the flag register.

If all of the bits in the accumulator are equal to zero, for example as the result of an operation, then the zero flag is set in the flag register, that is to say is set to a logic "1". The states of the flag bits are of significance particularly when the execution of particular operations, for example a conditional jump, requires a query to the flag register. By way of example, conditional jumps are executed only if the query in question is true, which means that the corresponding bit in the flag register needs to be set.

For the purpose of setting and erasing the bits, the microprocessor arrangement incorporates electronic circuits or gates which switch after every executed operation on the basis of the computation result and in so doing actuate or update the flag register. The switching of the gates produces a characteristic current profile. "Side-channel attacks" involve the current drawn or the electromagnetic emission from the gates being detected, for example. The time profile, particularly the timing of the current drawn or of the electromagnetic emission, allows conclusions to be drawn about a computation algorithm which is being used, for example, or even allows some of the useful information processed to be ascertained.

Differential power analysis (DPA) is a known attack scenario for security CPUs. Such an attack involves a succession of instructions in a program and their effects in the circuit to be ascertained using statistical evaluations of the characteristic curves of the current drawn. These evaluations may be used to reach detailed conclusions about the program which is being executed. The detection of electromagnetic emission is known by the term DEMA ("Differential Electro-Magnetic Analysis").

It follows from this that the integrated circuits, such as microprocessor arrangements, should be of such a nature that they have a high level of security against the spying-out of data.

SUMMARY OF THE INVENTION

An object of the present invention is therefore to specify a microprocessor arrangement and a method for operating a microprocessor arrangement which allow data to be processed in a way which is immune to tapping.

This object is achieved by means of a microprocessor arrangement which has an execution unit for controlling a program cycle and for processing arithmetic and logic operations, a working register, for storing a result of the operation, and a flag register which indicates information about the result of the operation using flag bits, wherein combinational logic elements which are connected to the working register are controlled such that the state of the flag bits in the flag register is updated after the executed operation only if execution of one of subsequent operations within the program cycle requires a status of the flag bits.

This object is also achieved by a method for operating a microprocessor arrangement which has an execution unit, for controlling a program cycle and for processing arithmetic and logic operations, a working register which is coupled to a control element in the execution unit and which stores a result of the operation, and a flag register which indicates information about the result of the operation using flag bits, wherein the state of the flag bits in the flag register is updated only if execution of an operation within the program cycle requires a status of the flag bits.

Following the execution of an operation by the execution unit, a computation result is stored in the working register, wherein the execution unit has a control element, for example a comparator, which checks the data stored in the working register and sets or erases the flag bits in the flag register on the basis of the data. So that this does not take place for every operation carried out, the microprocessor arrangement is designed such that the working registers have associated combinational logic elements. Advantageously, the combinational logic elements have a first input, to which a value from a memory position in the working register is supplied. A second input is used to supply an enable signal. An output on the combinational logic element is connected to the control element in the execution unit, and the combinational logic element is activated on the basis of the supply of the enable signal, so that the comparator is provided with access to the value at the memory position in the working register and the flag bit in the flag register can be updated as appropriate.

Advantageously, the supply of the enable signal and hence the actuation of the flag register by the control element in the execution unit is controlled exclusively by a programmer for the operations which are to be executed in a program. The programmer may use either an instruction implemented in the program or an instruction which is input via an input system in order to initiate the enable signal and to supply it to the combinational logic element or can make automatic provision in the program, in a compiler or in a linker for the enable signal to be generated and supplied to the combinational logic element only if an instruction for executing the operation is being coded which requires the state of the flag bit in order to be executed.

A programmer thus has the option of creating a program in which results which are obtained through operations and are stored in the working register are evaluated, for the purpose of updating the flag register, only if this is required in order to execute the operation.

BRIEF DESCRIPTION OF THE DRAWING

Further advantages, features and expediences of the invention and the way in which it works are explained in more detail with reference to the exemplary embodiment described below.

DETAILED DESCRIPTION OF PREFERRED EMBODIMENTS OF THE INVENTION

Figure 1:
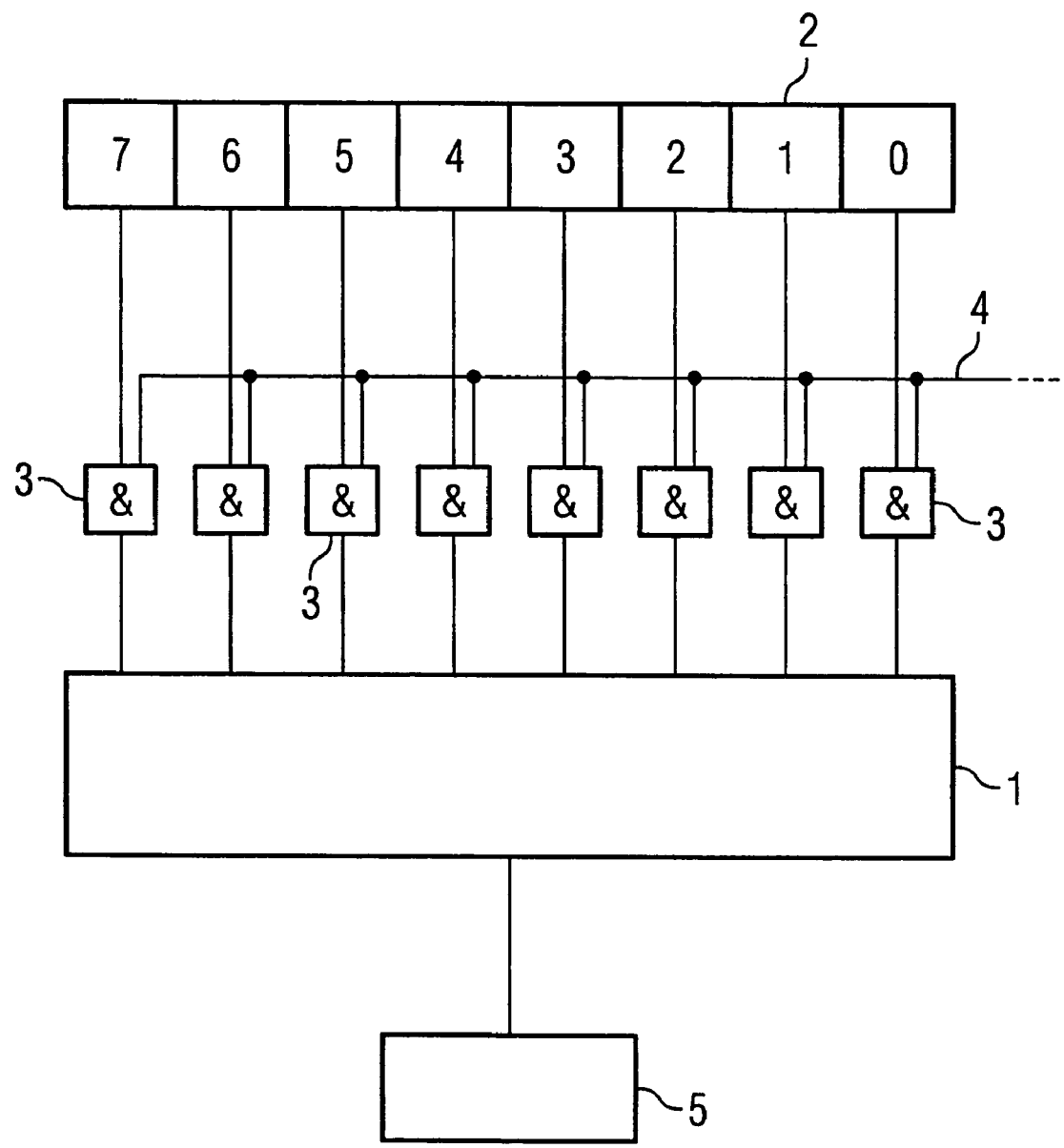
FIG. 1 shows a block diagram with elements of a microprocessor arrangement which are relevant to the invention.

The microprocessor arrangement shown in FIG. 1 with elements which are relevant to the invention shows a sub-function unit which is relevant to the invention in a central execution unit (not shown here), the "arithmetic and logic unit" (ALU), which controls a program cycle and processes logic and arithmetic instructions, and which is shown as a control element 1 in this case. The operands needed to execute the instructions are either stored in a working register 2 which is coupled to further function units (not shown here) in the execution unit or are applied via an internal bus (not shown here). In this exemplary embodiment, the working register 2 is in the form of an 8-bit register. The signal path between the control element 1 in the execution unit and the working register 2 contains combinational logic elements 3, which are in the form of AND gates in this case. Each memory position 0 to 7 in the working register 2 has a respective associated AND gate 3. Each AND gate 3 has a first and a second input, with the first input respectively being used to supply the AND gate 3 with a value for a data item stored in one of the memory positions 0 to 7 in the working register 2. The second input of each AND gate 3 is connected to a control line 4 which can be used to supply an enable signal.

When the AND gates are supplied with the enable signal, the AND gates are prompted to switch the data stored in the working register 2 through to the control element 1 in the execution unit. Comparators incorporated in the control element 1 in the execution unit, by way of example, now evaluate every single value, supplied via the AND gates 3, at the memory positions 0 to 7 in the working register 2 and actuate a flag register 5 connected to the control element 1 in the execution unit, so that flag bits stored in the flag register 5 are set or erased on the basis of the evaluation result.

A fundamental concept of the invention is based on the circumstance that it is not absolutely necessary to query the flag bits in the flag register in order to execute operations. The continuous (on the basis of the prior art) performance of a comparison for the data stored in the working register is not necessary for many instructions, since the execution of these instructions is not dependent on information from the flag bits. The direct actuation of the combinational logic elements updates the flag bits only when the continued program execution necessitates this. Hence, analysis of a current drawn when all of the gates involved are switched also allows no conclusions to be drawn about the operations which are being executed.

The invention claimed is:

1. A microprocessor arrangement comprising:
   an execution unit for controlling a program cycle and for processing arithmetic and logic operations;
   a working register having a plurality of bits which stores a result of an operation and which is coupled to a control element in the execution unit;
   a flag register which indicates information about the result of the operation using flag bits; and
   combinational logic elements which are each connected to one of the bits of the working register,
   wherein the combinational logic elements are controlled such that the state of the flag bits in the flag register is updated after the executed operation only if execution of one of subsequent operations within the program cycle requires a status of the flag bits, the flag bits are not queried to execute said operations not dependent on the flag bits.

2. The microprocessor arrangement as claimed in claim 1, wherein each of the combinational logic elements have a first input for supplying a value from a memory position in the working register and a second input for supplying an enable signal.

3. The microprocessor arrangement as claimed in claim 1, wherein each of the combinational logic elements have an output which is connected to the control element in the execution unit, wherein the control element in the execution unit updates the state of the flag bits when the combinational logic elements are supplied with an enable signal which activates the combinational logic elements.

4. The microprocessor arrangement as claimed in claim 1, wherein the combinational logic elements are made up of an AND gate associated with each memory position in the working register.

5. The microprocessor arrangement as claimed in claim 3, wherein the enable signal is generated by an input of an instruction, which is initiated by a programmer of the program.

6. The microprocessor arrangement as claimed in claim 3, wherein the enable signal is generated automatically when an instruction for an operation, which requires the status of the flag bit in order to execute the instruction, is decoded.

7. A method for operating a microprocessor arrangement which has an execution unit, comprising:
   controlling a program cycle and for processing arithmetic and logic operations;
   storing a result of the operation in a working register which is coupled to a control element in the execution unit;
   indicating information about the result of the operation using flag bits in a flag register; and
   updating, the state of the flag bits in the flag register only if an execution of an operation within the program cycle requires a status of the flag bits and the flag bits are not queried to execute said operations not dependent on the flag bits.

8. The method as claimed in claim 7, further comprising supplying combinational logic elements associated with the working register with an enable signal which activates the combinational logic elements and prompts the control element in the execution unit to update the state of the flag bits.

9. The method as claimed in claim 8, wherein the enable signal is generated by the input of an instruction, which is initiated by a programmer of the program, and is supplied to the combinational logic elements.

10. The method as claimed in claim 8, wherein the enable signal is supplied automatically as soon as an instruction for an operation, which requires the status of the flag bits in order to execute an instruction, is decoded.

11. A microprocessor arrangement comprising:
   an execution unit for controlling a program cycle and for processing arithmetic and logic operations;

an 8 bit working register which stores a result of an operation;
a flag register which indicates information about the result of the operation using flag bits;
combinational logic elements comprising first inputs each connected to one of the bits of the working register, second inputs each connected to a control line and outputs;
comparators, which are coupled between the outputs of the combinational logic elements and the flag register;
wherein the comparators evaluate every bit of the working register and actuate the flag register so that the flag bits are set or erased on the basis of the evaluation result if a control line enables the combinational logic elements after the executed operation if execution of one of subsequent operations within the program cycle requires a status of the flag bits.

* * * * *